UNITED STATES PATENT OFFICE.

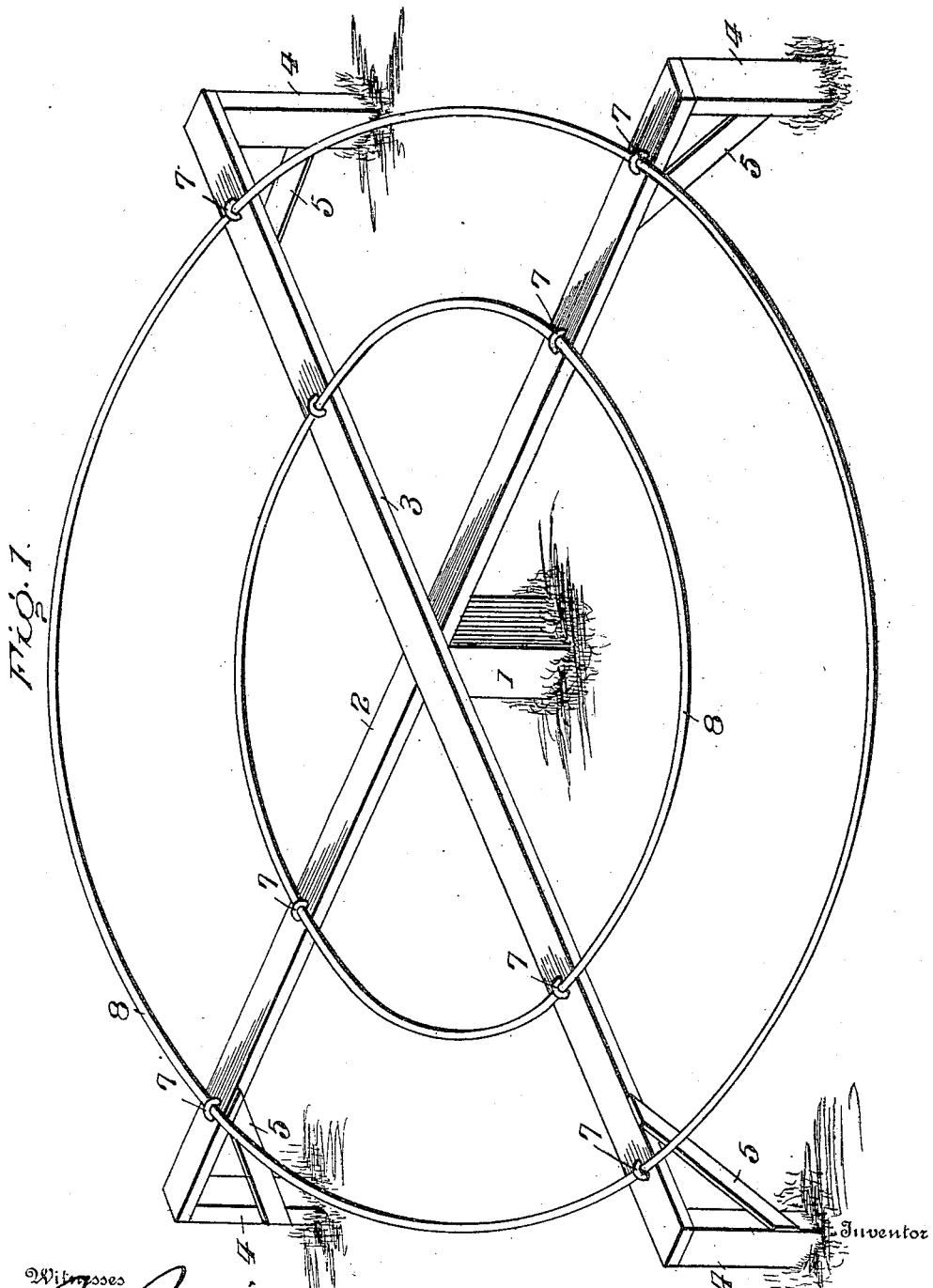

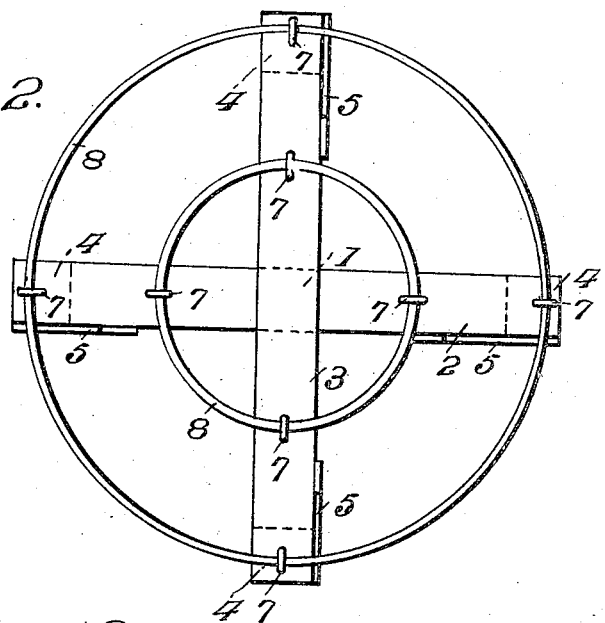
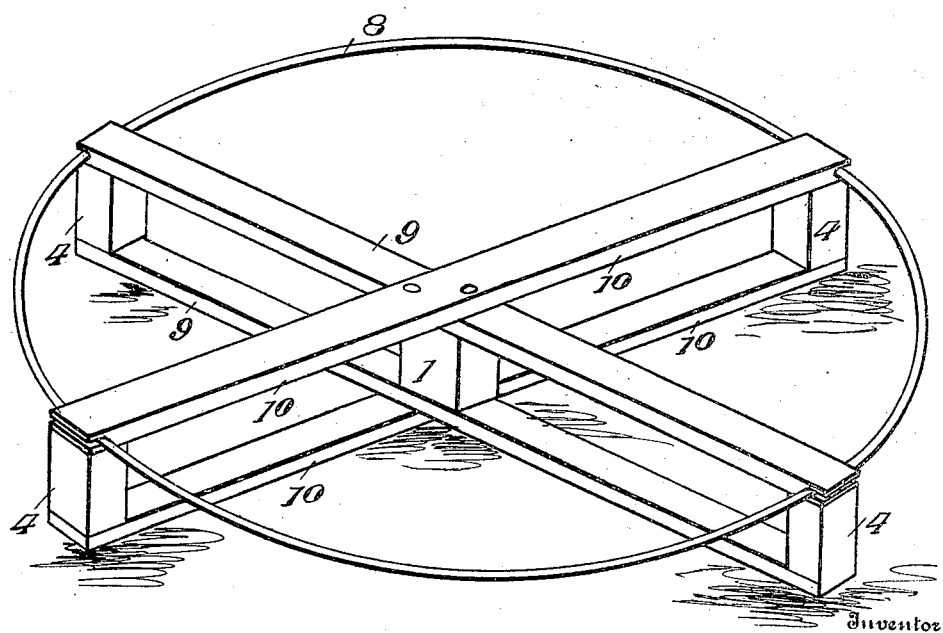

BENJIMIN B. PEETE, OF BELLE MINA, ALABAMA.

SHOCK-SUPPORT.

No. 816,595.  Specification of Letters Patent.  Patented April 3, 1906.

Application filed June 24, 1905. Serial No. 266,860.

*To all whom it may concern:*

Be it known that I, BENJIMIN B. PEETE, a citizen of the United States, residing at Belle Mina, in the county of Limestone and State of Alabama, have invented certain new and useful Improvements in Shock-Supports, of which the following is a specification.

This invention relates to a novel device for keeping hay from coming into contact with the ground during the curing process.

It consists of an elevated support for the shocks of hay and comprises, essentially, a framework formed by intersecting bars and transverse members connecting the arms thereof.

It has for its object to greatly hasten and facilitate the curing of hay and to obviate the difficulty commonly experienced in the South in properly curing pea-vine, clover, and sorgum hay.

A further object is to produce a device of the character mentioned which will be very effective in operation and simple and durable in construction.

For a full description of the invention and the merits thereof and also to acquire a knowledge of the details of construction of the means for effecting the result reference is to be had to the following description and accompanying drawings, in which—

Figure 1 is a perspective view of the device as constructed by me. Fig. 2 is a top plan view of the device. Fig. 3 is a perspective view showing a modification.

Corresponding and like parts are referred to in the following description and indicated in all the views of the drawings by the same reference characters.

The numeral 1 designates the center post, upon which are placed the cross-bars 2 and 3 and which is of such a height as to elevate the hay a suitable distance from the ground, usually about ten inches. The cross-bars 2 and 3 are of a length corresponding to the size of the shock-support required and are supported at the ends by upright members 4. Diagonal braces 5 may be employed to connect the upright members 4 and the cross-bars in order to reinforce and strengthen the framework. A wire 8 is stretched around the top of the framework and may be secured to the cross-bars by nails 7 or other suitable fastenings. If desired, the wire may be passed around notches or grooves in the ends of the cross-bars, and thus held in position without the use of nails. In the larger sizes two or more spaced wires connecting the arms of the cross-bars may be required in order to prevent the hay from sagging and coming into contact with the ground. In order to secure a more level surface, it may be found desirable to secure the outer wire by passing it through notches in the ends of the upper cross-bar and fastening it to the lower cross-bar by nails.

A modification of this device is shown in which two intersecting cross-bars 9 and 10 are also secured to the lower end of the center post 1 and are designed to rest upon the ground, the ends of the corresponding upper and lower cross-bars being connected by upright members 4. When thus constructed, the lower members 9 and 10 will form inwardly-extending braces and it will not be found necessary to employ the diagnoal braces 5. It will thus be understood that I have invented a shock-support which can be manufactured at comparatively small cost, and which will effectively keep the hay from contact with the damp ground, and which will permit a free circulation of air beneath the hay.

Having thus described the invention, what is claimed as new is—

1. A shock-support comprising a center post, intersecting cross-bars supported thereon and rigidly secured thereto at points between their ends, transverse supporting members connecting the outwardly-extending arms of the intersecting cross-bars, upright supports at the extremities of the cross-bars, and inwardly-extending braces connecting the upright supports to inner portions of the shock-support.

2. A shock-support comprising a center post, intersecting cross-bars supported thereon, a corresponding set of intersecting cross-bars at the base of the center post, upright members connecting the ends of the corresponding upper and lower cross-bars, and transverse members connecting the arms of the upper set of cross-bars.

3. A shock-support comprising intersecting cross-bars, a wire stretched around the cross-bars and held in position by notches or grooves in the ends of the cross-bars, and means for supporting the device a suitable distance from the ground.

4. A shock-support comprising a center post, intersecting cross-bars supported thereon and having their extremities notched, a corresponding set of intersecting cross-bars at the base of the center post, upright supports connecting the ends of the corresponding upper and lower cross-bars, and a transverse supporting member passing around the upper cross-bars and secured in the notches at the extremities thereof.

In testimony whereof I affix my signature in presence of two witnesses.

BENJIMIN B. PEETE. [L. S.]

Witnesses:
D. T. PHILLIPS,
GEO. MALONE.